(12) United States Patent
Oshimo

(10) Patent No.: US 7,000,910 B2
(45) Date of Patent: Feb. 21, 2006

(54) SUSPENSION UNIT

(75) Inventor: Hiroki Oshimo, Hiroshima (JP)

(73) Assignee: Delta Tooling Co., Ltd., Hiroshima (JP)

( * ) Notice: Subject to any disclaimer, the term of this patent is extended or adjusted under 35 U.S.C. 154(b) by 0 days.

(21) Appl. No.: 10/854,185

(22) Filed: May 27, 2004

(65) Prior Publication Data

US 2004/0239022 A1 Dec. 2, 2004

(30) Foreign Application Priority Data

May 29, 2003 (JP) .............................. 2003-152879

(51) Int. Cl.
*B60G 11/32* (2006.01)
(52) U.S. Cl. ...................... 267/259; 267/131; 267/136
(58) Field of Classification Search ................ 267/131, 267/136, 253, 254, 255, 259
See application file for complete search history.

(56) References Cited

U.S. PATENT DOCUMENTS

| 6,336,627 B1 * | 1/2002 | Fujita et al. ................. 267/131 |
| 6,366,190 B1 * | 4/2002 | Fujita et al. ................. 335/285 |
| 6,585,240 B1 * | 7/2003 | Fujita et al. ................. 267/136 |

* cited by examiner

*Primary Examiner*—Melanie Torres
(74) *Attorney, Agent, or Firm*—Wenderoth, Lind & Ponack, L.L.P.

(57) ABSTRACT

A suspension unit includes a lower frame and an upper frame vertically movably mounted on the lower frame via a link mechanism. The suspension unit also includes a magneto-spring unit for resiliently supporting the upper frame relative to the link mechanism. The amount of motion of the magneto-spring unit is smaller than that of the suspension unit, making it possible to provide a relatively compact suspension unit having a large stroke.

1 Claim, 6 Drawing Sheets

US 7,000,910 B2

SUSPENSION UNIT

BACKGROUND OF THE INVENTION

1. Field of the Invention

The present invention relates generally to a suspension unit having a magneto-spring unit and metal springs and, in particular but not exclusively, to a suspension unit having a spring constant of substantially zero in a predetermined range by combining a magneto-spring unit having a negative spring constant and metal springs having a positive spring constant.

2. Description of the Related Art

In recent years, vehicle technologies including automobile technologies have been remarkably developed, and safety and riding-comfort as well as maneuverability are desired. Recently, with the practical use of permanent magnets that have a high coercive force and a high residual magnetic flux density, research is flourishing in areas such as mechanical structures and magnetic systems that utilize magnetic levitation, magnetic bearings, dampers employing a magnetic fluid, or the like. The inventors of this application have hitherto proposed suspension units in which a magneto-spring is utilized.

However, in a suspension unit having a spring constant of substantially zero in a predetermined range by combining a magneto-spring having a negative spring constant and metal springs having a positive spring constant, a large stroke results in a very large unit.

SUMMARY OF THE INVENTION

The present invention has been developed to overcome the above-described disadvantages.

It is accordingly an objective of the present invention to provide a relatively compact suspension unit that ensures a large stroke by making the amount of motion of the magneto-spring unit be smaller than that of the suspension unit.

In accomplishing the above and other objectives, the suspension unit according to the present invention includes a lower frame, an upper frame vertically movably mounted on the lower frame, and a link mechanism for connecting the lower frame and the upper frame. The suspension unit also includes a magneto-spring unit for resiliently supporting the upper frame relative to the link mechanism, and a plurality of metal springs having opposite ends hooked on the upper frame and a portion of the link mechanism, respectively.

By this construction, the amount of motion of the magneto-spring unit is made smaller than that of the suspension unit, resulting in a relatively compact suspension unit having a large stroke.

Advantageously, the link mechanism includes an X-link having two links and the magneto-spring unit includes a stationary magnet unit and a movable magnet unit. The stationary magnet unit is mounted on the upper frame and the movable magnet unit is mounted on the X-link.

The suspension unit also includes an operating member for operating the plurality of metal springs to adjust a load applied to the upper frame. The link mechanism further includes a first torsion bar that produces a lifting force of the upper frame.

Advantageously, the suspension unit includes a second torsion bar mounted on the upper frame and a contact plate secured to a portion of the link mechanism, wherein when a displacement of the upper frame relative to the lower frame is greater than a predetermined value, the second torsion bar impinges on the contact plate to thereby produce a lifting force of the upper frame.

The plurality of elastic means such as the magneto-spring unit, the plurality of metal springs, and the first and second torsion bars make it possible to provide a suspension unit having a spring constant of substantially zero with respect to a displacement in a predetermined range.

BRIEF DESCRIPTION OF THE DRAWINGS

The above and other objectives and features of the present invention will become more apparent from the following description of a preferred embodiment thereof with reference to the accompanying drawings, throughout which like parts are designated by like reference numerals, and wherein.

DETAILED DESCRIPTION OF THE PREFERRED EMBODIMENT

This application is based on an application No. 2003-152879 filed May 29, 2003 in Japan, the content of which is herein expressly incorporated by reference in its entirety.

Figure 1:
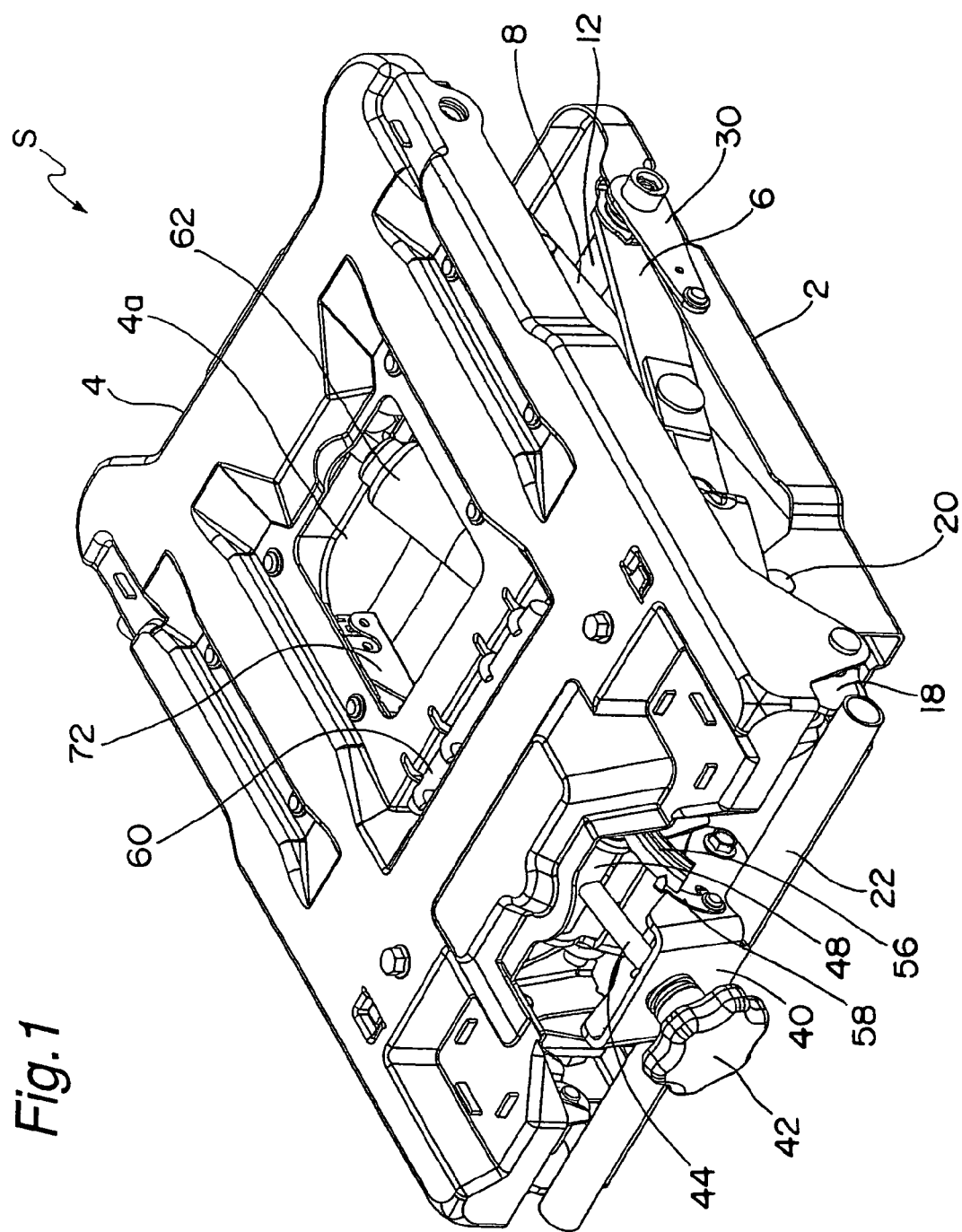
FIG. 1 is a perspective view of a suspension unit according to the present invention.
Figure 2:
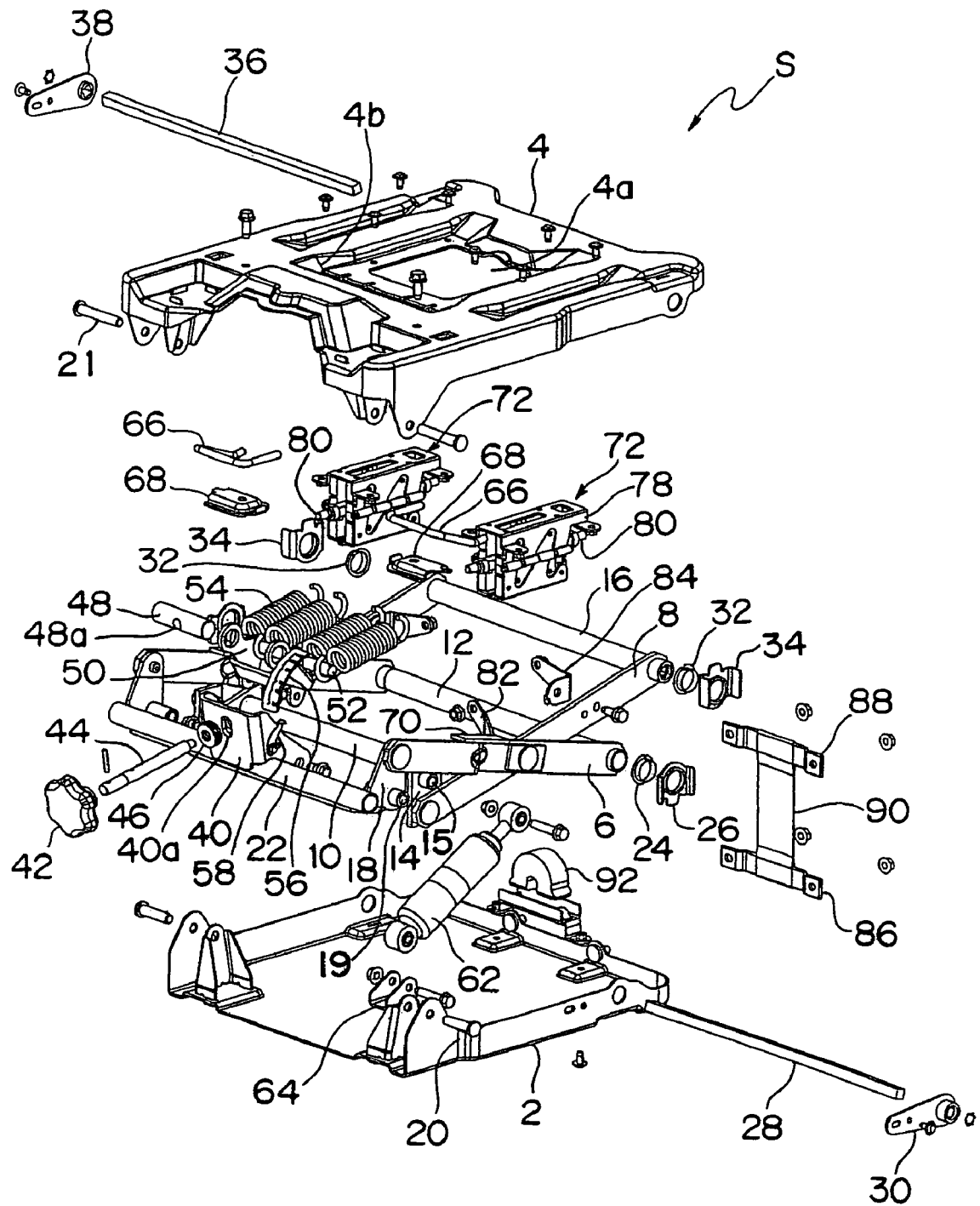
FIG. 2 is an exploded perspective view of the suspension unit of FIG. 1.

Referring now to the drawings and particularly to FIGS. 1 and 2, there is shown a suspension unit S embodying the present invention, which is used as a seat suspension, for example. The suspension unit S includes a generally rectangular lower frame 2 to be mounted on a vehicle floor and a generally rectangular upper frame 4 mounted on the lower frame 2 so as to be vertically movable relative thereto. A vehicle seat (not shown) is placed on the upper frame 4.

An X-link having two links 6, 8 rotatably connected to each other at intermediate portions thereof is disposed on each side of the suspension unit S. A front end of each link 6 is connected to a generally triangular oscillating plate 18, while rear ends of both the links 6 are connected to each other via a cylindrical connecting shaft 12. A front end of each link 8 is connected to a lower end of a generally rectangular oscillating plate 14. Both the links 8 are connected to each other at respective positions apart a predetermined length rearwards from the front end thereof via a cylindrical connecting shaft 10 and at rear ends thereof via a cylindrical connecting shaft 16. A bushing 15 rigidly secured to an upper portion of the oscillating plate 14 is rotatably connected to a front portion of the lower frame 2 via a pin 20.

A bushing 19 rigidly secured to a lower portion of the oscillating plate 18 is rotatably connected to a front portion of the upper frame 4 via a pin 21, and the oscillating plate 18 is joined to an end of a cylindrical connecting shaft 22 at a location forwards of the bushing 19.

The rear connecting shaft 12 of the links 6 has a slip ring 24 mounted on each end thereof, on which a retainer ring 26 fixed to an inner surface of a side wall of the lower frame 2 is mounted for rotatably supporting the rear connecting shaft 12. A torsion bar 28 having a square section is loosely inserted in the rear connecting shaft 12. One end of the torsion bar 28 is secured to one end (rear end) of a lever 30, the other end (front end) of which is secured to the side wall of the lower frame 2. The other end of the torsion bar 28 is secured to an end of the rear connecting shaft 12.

The rear connecting shaft 16 of the links 8 similarly has a slip ring 32 mounted on each end thereof, on which a retainer ring 34 fixed to an inner surface of a side wall of the upper frame 4 is mounted for rotatably supporting the rear connecting shaft 16. A torsion bar 36 having a square section is loosely inserted in the rear connecting shaft 16. One end of the torsion bar 36 is secured to one end (rear end) of a lever 38, the other end (front end) of which is secured to the side wall of the upper frame 4. The other end of the torsion bar 36 is secured to an end of the rear connecting shaft 16.

A U-shaped bracket 40 is joined to the connecting shaft 22 and has an elongated opening 40a defined in a front wall thereof. An operating shaft 44 having a knob 42 mounted on a front end thereof is loosely inserted in the elongated opening 40a of the U-shaped bracket 40, and a slip ring 46 is interposed between a rear end of the knob 42 and the front wall of the U-shaped bracket 40. The operating shaft 44 has a male screw formed thereon, which is held in mesh with a female screw 48a formed in a load adjusting shaft 48 that is located rearwards of the front wall of the U-shaped bracket 40.

The load adjusting shaft 48 is rotatably connected to an upper portion of a spring-holding bracket 50 that is bent in the form of "U", a lower portion of which is pivotally connected to a lower portion of the U-shaped bracket 40. A spring-holding shaft 52 is mounted on a rear portion of the spring-holding bracket 50, and a plurality of metal springs 54 are hooked at respective front ends on the spring-holding shaft 52. The spring-holding bracket 50 has a load (weight) scale 56 mounted on a side portion thereof, and a pointer 58 confronting the load scale 56 is mounted on a side portion of the U-shaped bracket 40.

The upper frame 4 has a rectangular opening 4a defined therein and a recess 4b formed at a location forwards of the rectangular opening 4a. A rear spring-holding shaft 60 is received in the recess 4b, and the plurality of metal springs 54 referred to above are hooked at respective rear ends on the rear spring-holding shaft 60. A damper 62 is pivotally connected at a rear end (upper end) thereof to a lower surface of a rear portion of the upper frame 4 via a bracket (not shown), and is also pivotally connected at a front end (lower end) thereof to a bracket 64 that is joined to the lower frame 2 in proximity to a central portion thereof. Two torsion bars 66 bent in the form of "U" are disposed at a front portion of the upper frame 4, and an inner end of each torsion bar 66 is secured to the upper frame 4 by means of a mounting member 68, while an outer end of each torsion bar 66 is positioned above a contact plate 70 joined to the link 6.

A magneto-spring unit 72 for resiliently supporting the upper frame 4 relative to the X-link 6, 8 is disposed on each side of the damper 62 and includes a stationary magnet unit 74 and a movable magnet unit 76.

Figure 3A:
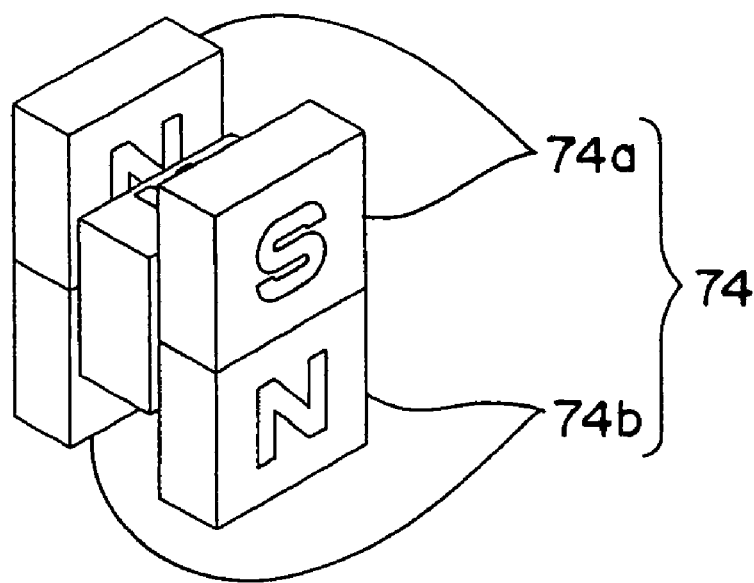
FIG. 3A is a schematic perspective view of a magneto-spring unit mounted in the suspension unit of FIG. 1.
Figure 3B:
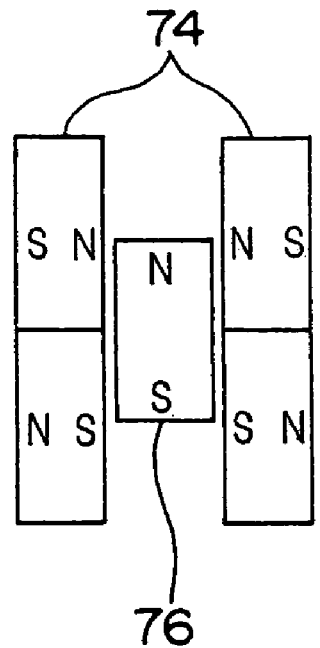
FIG. 3B is a front view of the magneto-spring unit of FIG. 3A.

As best shown in FIGS. 3A and 3B, the stationary magnet unit 74 includes a pair of upper permanent magnets 74a and a pair of lower permanent magnets 74b. The pair of upper magnets 74a are spaced apart a predetermined distance with like magnetic poles opposed to each other. The same is true of the pair of lower magnets 74b. The upper magnet 74a and the lower magnet 74b positioned on the same side are joined to each other such that unlike magnetic poles are oriented in the same direction (inwards or outwards). On the other hand, the movable magnet unit 76 has a permanent magnet positioned within an internal space in the stationary magnet unit 74, and this permanent magnet has two magnetic poles formed on upper and lower portions thereof, respectively. The upper magnetic pole confronts the like magnetic poles of the pair of upper magnets 74a of the stationary magnet unit 74, and the lower magnetic pole similarly confronts the like magnetic poles of the pair of lower magnets 74b of the stationary magnet unit 74. As shown in FIG. 3B, a predetermined clearance is present between the stationary magnet unit 74 and the movable magnet unit 76.

As shown in FIG. 2, each stationary magnet unit 74 is secured to an inner surface of a side wall of a metal frame 78 mounted on the upper frame 4. The movable magnet unit 76 disposed within the internal space in the stationary magnet unit 74 has front and rear mounting members 80 formed on opposite ends thereof, which are in turn supported by brackets 82, 84 secured to the two links 6, 8 of the X-link, respectively.

Belt holding members 86, 88 made of a metal are joined to a rear portion of the lower frame 2 and a rear portion of the upper frame 4, respectively, and opposite ends of a stroke restraining belt 90 are secured to the belt holding members 86, 88, respectively. A cushioning member 92 made of, for example, rubber is mounted on a rear portion of the lower frame 2.

The suspension unit S of the above-described construction operates as follows.

When a user sits on a vehicle seat placed on the upper frame 4, the upper frame 4 moves downwards according to the load (weight of the user). The downward movement of the upper frame 4 twists the lower torsion bar 28 and the upper torsion bar 36 to produce a lifting force of the upper frame 4 according to the length of travel of the upper frame 4. The downward movement of the upper frame 4 also expands the plurality of metal springs 54 to produce a lifting force of the upper frame 4 according to the length of travel of the upper frame 4. On the other hand, in an unloaded condition, the outer end of each torsion bar 66 mounted on the upper frame 4 is spaced apart from the contact plate 70 joined to the link 6. When a load greater than a predetermined value is applied to the upper frame 4 to move the upper frame 4 downwards by a length of travel greater than a predetermined value (for example, 10 mm (see FIG. 4)), the outer end of each torsion bar 66 impinges on the contact plate 70, thereby gradually producing a lifting force of the upper frame 4 according to the length of travel of the upper frame 4. The magneto-spring unit 72 presents a negative spring constant until a load greater than a predetermined value is applied to the upper frame 4 to move the upper frame 4 downwards by a length of travel greater than a predetermined value (for example, 25 mm (see FIG. 4)), and when the upper frame 4 further moves downwards over the predetermined value, the magneto-spring unit 72 comes to present a positive spring constant and then gradually produces a lifting force of the upper frame 4 according to the length of travel of the upper frame 4.

Figure 4:
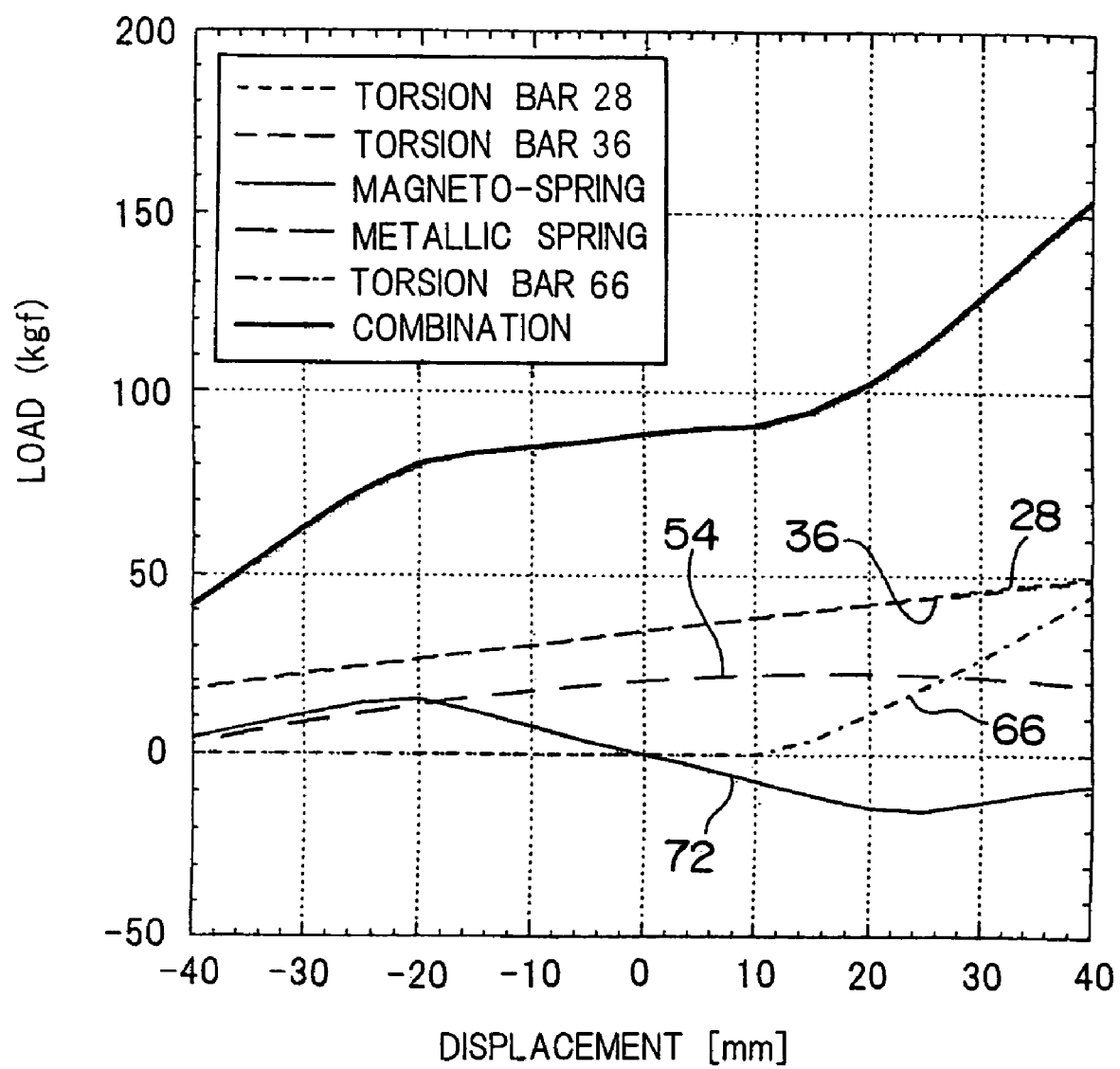
FIG. 4 is a graph indicating the spring properties of a plurality of elastic means in the case where the load to be applied to the suspension unit of FIG. 1 has been adjusted to 70 kg.

The graph of FIG. 4 indicates the spring properties of the lower torsion bar 28, upper torsion bar 36, metal springs 54, U-shaped torsion bars 66, and magneto-spring unit 72 in the case where the load has been adjusted to 70 kg by rotating the knob 42.

The graph of FIG. 4 reveals that each of the lower torsion bar 28 and the upper torsion bar 36 has a linear spring constant irrespective of the displacement (stroke), while the U-shaped torsion bars 66 have a linear spring constant with respect to a displacement greater than a predetermined value. The graph of FIG. 4 also reveals that the metal springs 54 have a spring constant close to a linear one, but present a negative spring constant, although small, with respect to a load greater than a predetermined value (20 mm in the graph of FIG. 4), and that the magneto-spring unit 72 has a negative spring constant within a predetermined range (about ±20 mm in the graph of FIG. 4), but presents a positive spring constant outside this range.

The load adjustment that is carried out by rotating the knob 42 is explained hereinafter.

Because the knob 42 is mounted on the front end of the operating shaft 44 and the male screw formed on the operating shaft 44 is in mesh with the female screw 48a formed in the load adjusting shaft 48, the distance between the knob 42 and the load adjusting shaft 48 varies by rotating the knob 42. When rotation of the knob 42 causes the load adjusting shaft 48 to approach the knob 42, the spring-holding bracket 50 pivots forwards about a lower portion thereof at which the spring-holding bracket 50 is connected to the U-shaped bracket 40. As a result, the plurality of metal springs 54 hooked on the front spring-holding shaft 52 expand, thereby increasing the lifting force of the upper frame 4. In contrast, when rotation of the knob 42 causes the load adjusting shaft 48 to move away from the knob 42, the spring-holding bracket 50 pivots rearwards about the lower portion thereof, and the plurality of metal springs 54 contract, thereby reducing the lifting force of the upper frame 4.

The user can carry out the load adjustment referred to above while watching the load scale 56 to which the pointer 58 points, and the load can be adjusted in a range of, for example, 50 kg to 130 kg.

Figure 5:
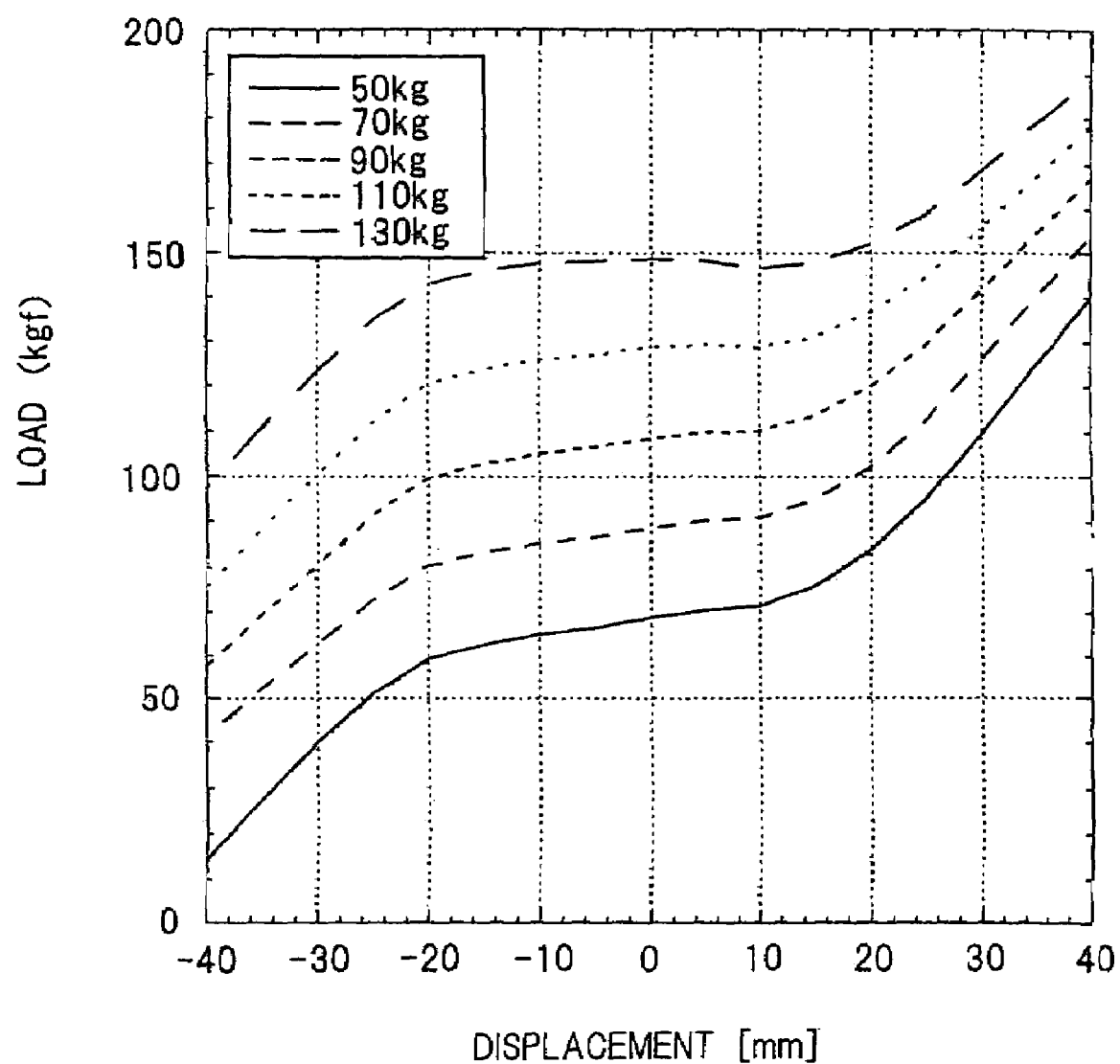
FIG. 5 is a graph indicating the static characteristics of the suspension unit of FIG. 1.

FIG. 5 is a graph indicating the static characteristics of the suspension unit S according to the present invention where the load is 50 kg, 70 kg, 90 kg, 110 kg, and 130 kg. The graph of FIG. 5 reveals that the suspension unit S has a spring constant of substantially zero or close to zero with respect to a displacement in a predetermined range.

Figure 6:
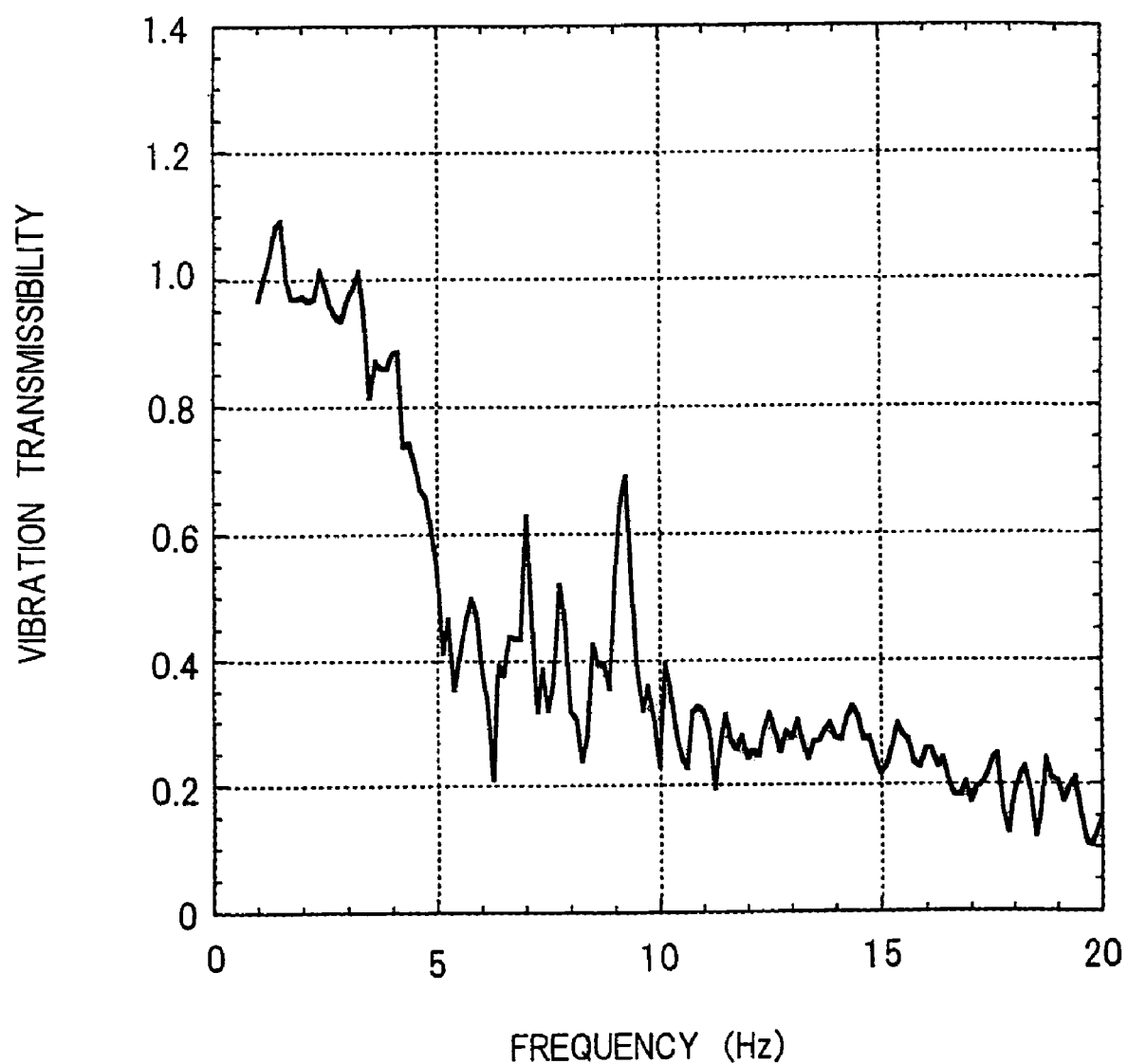
FIG. 6 is a graph indicating the dynamic characteristics of the suspension unit of FIG. 1.

FIG. 6 is a graph indicating the dynamic characteristics of the suspension unit S according to the present invention. The graph of FIG. 6 reveals that the vibration transmissibility at a resonance point is restrained to be low and that both the vibration characteristics at the resonance point and the impact absorption are good and the vibration characteristics in a high frequency region is also good.

When a vibration is inputted to a vehicle frame (not shown), the damper 62 operates to attenuate the vibration. When an impact force is inputted to cause the lower frame 2 to abnormally approach the upper frame 4, the rear connecting shaft 16 impinges on the cushioning member 92, thereby absorbing the impact (bottom-end shock). When the lower frame 2 comes to move abnormally away from the upper frame 4, a tension is applied to the stroke restraining belt 90, which in turn restrains the stroke of the upper frame 4 relative to the lower frame 2.

It is to be noted that although the above-described embodiment has been explained taking the case of the seat suspension on which a vehicle seat is mounted, the present invention is not limited to only the seat suspension, but can be used as a vibration isolator, on which an apparatus other than the vehicle seat is placed, for attenuating a vibration from outside.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. A suspension unit comprising:

a lower frame;

an upper frame vertically movably mounted on the lower frame;

a link mechanism for connecting the lower frame and the upper frame;

a magneto-spring unit for resiliently supporting the upper frame relative to the link mechanism; and a plurality of metal springs having opposite ends hooked on the upper frame and a portion of the link mechanism, respectively, wherein the link mechanism comprises a first torsion bar that produces a lifting force of the upper frame, wherein a second torsion bar is mounted on the upper frame and a contact plate secured to a portion of the link mechanism, and wherein when a displacement of the upper frame relative to the lower frame is greater than a predetermined value, the second torsion bar impinges on the contact plate to thereby produce a lifting force of the upper frame.

* * * * *